United States Patent [19]

Ogasawara et al.

[11] Patent Number: 5,512,194
[45] Date of Patent: Apr. 30, 1996

[54] ACICULAR FERROMAGNETIC IRON OXIDE PARTICLES AND PROCESS FOR PRODUCING THE SAME

[75] Inventors: Makoto Ogasawara, Koka; Masakazu Yada, Suzuka; Kaoru Sakurai, Yokkaichi; Kazuya Haga, Yokkaichi; Masahide Miyashita, Yokkaichi; Yasumasa Hirai, Yokkaichi, all of Japan

[73] Assignee: Ishihara Sangyo Kaisha, Ltd., Osaka, Japan

[21] Appl. No.: 255,956

[22] Filed: Jun. 7, 1994

Related U.S. Application Data

[62] Division of Ser. No. 150,794, Nov. 12, 1993, abandoned, which is a continuation of Ser. No. 763,270, Sep. 20, 1991, abandoned.

[30] Foreign Application Priority Data

Sep. 26, 1990 [JP] Japan ..................................... 2-256380
Sep. 26, 1990 [JP] Japan ..................................... 2-256382

[51] Int. Cl.⁶ .................................................... C01G 49/02
[52] U.S. Cl. .................................... 252/62.56; 252/62.62; 423/632
[58] Field of Search ............................. 252/62.56, 62.62; 423/632

[56] References Cited

U.S. PATENT DOCUMENTS

| | | | |
|---|---|---|---|
| 4,002,804 | 1/1977 | Akashi et al. .................. | 252/62.56 |
| 4,069,164 | 1/1978 | Dezawa et al. ................. | 252/62.62 |
| 4,179,387 | 12/1979 | Sasazawa et al. ............... | 252/62.56 |
| 4,209,412 | 6/1980 | Marcot ........................... | 252/62.56 |
| 4,259,368 | 3/1981 | Rudolf et al. ................... | 427/130 |
| 4,297,395 | 10/1981 | Buxbaum et al. ............... | 252/62.56 |
| 4,311,684 | 1/1982 | Umeki ............................ | 423/632 |
| 4,367,214 | 1/1983 | Sarnecki et al. ................ | 252/62.56 |
| 5,041,307 | 8/1991 | Koyama et al. ................. | 427/127 |

FOREIGN PATENT DOCUMENTS

| | | |
|---|---|---|
| 0014363 | 8/1980 | European Pat. Off. . |
| 2510799 | 9/1975 | Germany . |
| 2534301 | 2/1976 | Germany . |
| 53-76198 | 7/1978 | Japan . |
| 53-87961 | 8/1978 | Japan . |
| 57-156333 | 9/1982 | Japan . |
| 58-199725 | 11/1983 | Japan . |
| 60-208805 | 10/1985 | Japan . |
| 61-4202 | 1/1986 | Japan . |
| 61-106420 | 5/1986 | Japan . |
| 2021089 | 11/1979 | United Kingdom . |

*Primary Examiner*—C. Melissa Bonner
*Attorney, Agent, or Firm*—Cushman Darby & Cushman

[57] ABSTRACT

There are provided acicular berthollide particles comprising crystalline particles expressed by the formula $FeO_x$ ($1.33 \leq x < 1.5$) and modified with a specific amount of zinc ions and a process producing the same which comprises the steps of oxidizing acicular magnetic iron oxide particles expressed by the formula $FeO_x$ ($1.0 < x < 1.33$) and modified with a specific amount of zinc ions which are produced by (a) heating and dehydrating acicular hydrous iron oxide particles containing a specific amount of a zinc component, reducing, and heating the particles under specific conditions, or (b) reducing acicular iron oxide particles containing a specific amount of a zinc component and heating the particles under specific conditions, or (c) heating acicular magnetic iron oxide particles expressed by the formula $FeO_x$ ($1.0 < x < 1.33$) containing a specific amount of zinc ions under specific conditions.

2 Claims, No Drawings

ACICULAR FERROMAGNETIC IRON OXIDE PARTICLES AND PROCESS FOR PRODUCING THE SAME

This is a division of application Ser. No. 08/150,794, filed Nov. 12, 1993 now abandoned which is a continuation of application Ser. No. 07/763,270 filed Sep. 20, 1991, abandoned.

BACKGROUND OF THE INVENTION

1. Field of the Invention

The present invention relates to acicular ferromagnetic iron oxide particles, and more particularly acicular ferromagnetic iron oxide particles suitable for magnetically recording mediums capable of recording sounds and images in a high density, a powdery acicular magnetic iron oxide useful as starting material for production of such particles, and a process for producing the same.

2. Description of Related Art

Recently, there has been an increasing need to enhance the performance of magnetically recording mediums such as magnetic tapes, magnetic disks, magnetic drums and the like, as apparatuses for magnetically recording and playing back sounds and images have been miniaturized and upgraded and as a magnetic information processing capacity has been greatly increased. That is, further enhancements in properties such as a high recording density, a high output and the like, have been increasingly demanded, which requires in turn specifically magnetic particles used in the magnetically recording mediums to be much finer and to have a higher coercive force and a higher saturation magnetization characteristic.

Although making magnetic particles finer is one of the most effective methods for reducing noises, it causes inevitably a reduction in the saturation magnetization of the particles as well as reductions in a filling ratio and an orientability of the magnetic particles in a magnetic layer containing them dispersed as the sizes of the particles are reduced. Therefore, there is a great need to further enhance the magnetization properties of the magnetic particles such as saturation magnetization and remanent magnetization so that the magnetically recording mediums can meet the requirements of having a higher recording density and a higher output. Thus, various techniques have been proposed to improve the magnetic properties of the magnetic particles for use in the magnetically recording mediums. For example, there have been known a method for improving the print-through property as well as the saturation magnetization by heat-treating an iron oxide powder to densify the crystalline texture (for example, Japanese Patent KOKAI (Laid-Open) No. Sho 58-199725), or a method for improving the print-through property as well as the saturation magnetization by modifying maghemite particles through coating with a combination of ferrous compounds and zinc compounds and, if necessary, by further heat-treating the coated particles to avoid reductions in the print-through property and the saturation magnetization due to the coating-treatment when the maghemite particles are modified through coating with cobalt compounds for increasing the coercive force (for example, Japanese Patent KOKAI (Laid-Open) Nos. Sho 53-87961, 60-208805, and 61-4202). In the former case, however, an attempt to obtain a sufficient print-through property tends to form $\alpha$-$Fe_2O_3$, to cause unavoidably deterioration in the saturation magnetization, and in the latter case, the coercive force varies to an large extent with time, though the coercive force and the saturation magnetization may be improved to a certain degree. Therefore, there have not been a few of difficulties to be improved yet.

Moreover, in order to provide magnetic particles which can meet the demands on the market as described above, the have been proposed those comprising primarily iron and those of berthollide particles having a crystalline structure partly modified with zinc ions which are produced by heat-treating berthollide particles having a zinc component, or heat-treating magnetite particles having a zinc component followed by oxidation treatment.

The magnetic particles comprising primarily iron as discussed above have characteristics of a high coercive force and a high saturation magnetization, but disadvantageously are expensive and not easily handled because of being highly prone to oxidation. Therefore, there have been a need to provide iron oxide based magnetic particles which are inexpensive and easy to handle and have higher coercive force and higher saturation magnetization properties.

The present inventors have been making various researches on improvement of the performance of magnetic iron oxide particles for the purpose of providing those which are capable of meeting the demand for higher recording densities and higher outputs and lower noise levels to be achieved by the magnetically recording mediums and have made an advancement in an attempt to improve the saturation magnetization of the particles through modification with a minor amount of metallic ions. In U.S. Pat. No. 5,041,307, it was proposed that by heat-treating berthollide particles containing a specific amount of zinc ions under specific heating conditions, or by heat-treating magnetite particles containing a specific amount of zinc ions under specific heating conditions and then subjecting the heat-treated particles to an oxidation-treatment allowing the ferrous ions to be included, the crystalline particles are modified with the zinc ions and the ferrous ions, whereby the synergetic effects of the zinc ions and the ferrous ions allow production of berthollide ($FeO_x$, $1.33<x<1.5$: that is, an intermediate oxide between magnetite and maghemite) particles having a much higher saturation magnetization, and in addition stable magnetic properties, a high dispersibility to coating composition and an excellent squareness. Moreover, it has been found that such berthollide particles may be coated with a cobalt compound or both a cobalt compound and a ferrous compound to achieve much more desirable magnetic properties so that they become extremely suitable to high density magnetic tapes for recording sounds and images.

In the cource of the investigation to improve the magnetic properties, the present inventors directed attention to and studied the modification of berthollide compounds, an intermediate oxide between magnetite and maghemite, with zinc ions. As a result, it has been found that specific berthollide particles having a higher performance can be produced.

SUMMARY OF THE INVENTION

An object of the present invention is to provide acicular ferromagnetic iron oxide particles suitable for a magnetically recording medium capable of recording sounds and images in a high density.

Still another object of the present invention is to provide a process for producing such acicular ferromagnetic iron oxide particles as above.

Another object of the present invention is to provide an acicular magnetic iron oxide useful as starting material for production of the above mentioned particles.

Still another object of the present invention is to provide a process for producing such acicular magnetic iron oxide particles useful as starting material for production of the aforementioned particles.

In an aspect of the present invention, there is provided berthollide particles comprising crystalline particles expressed by the formula FeOx ($1.33 \leq x < 1.5$) and modified with a specific amount of zinc ions.

In another aspect of the present invention, there is provided a process for producing berthollide particles comprising crystalline particles expressed by the formula FeOx ($1.33 \leq x < 1.5$) and modified with a specific amount of zinc ions which comprises steps of subjecting to oxidation treatment acicular magnetic iron oxide particles comprising crystalline particles expressed by the formula FeOx ($1.0 < x < 1.33$) and modified with a specific amount of zinc ions which are produced by heating and dehydrating acicular hydrous iron oxide particles containing a specific amount of a zinc component, reducing, and then heat-treating the particles under specific conditions, or by reducing acicular iron oxide particles containing a specific amount of a zinc component and then subjecting the particles to heat-treatment under specific conditions In still another aspect of the present invention, there is provided a process for producing berthollide particles comprising crystalline particles expressed by the formula FeOx ($1.33 \leq x < 1.5$) and modified with a specific amount of zinc ions which comprises steps of subjecting to oxidation treatment acicular magnetic iron oxide particles comprising crystalline particles expressed by the formula FeOx ($1.0 < x < 1.33$) and modified with a specific amount of zinc ions which are produced by heat-treating acicular magnetic iron oxide particles expressed by the formula FeOx ($1.0 < x < 1.33$) containing a specific amount of a zinc component under specific conditions.

In still another aspect of the present invention, there is provided such a process for producing berthollide particles as described above where the berthollide particles are treated with a cobalt compound or both a cobalt compound and a ferrous compound.

The berthollide particles according to the present invention have stable magnetic properties, a high dispersibility to coating composition without causing any deformation of particle configuration and any sintering, and an excellent squareness.

The berthollide particles treated with a cobalt compound or both a cobalt compound and a ferrous compound have much more desirable magnetic properties so that they become extremely suitable for use in high density magnetic tapes for recording sounds and images.

DESCRIPTION OF PREFERRED EMBODIMENTS

In an embodiment of the present invention there is provided acicular ferromagnetic iron oxide particles comprising crystalline particles having an aspect ratio not lower than 4, expressed by the formula FeOx ($1.33 \leq x < 1.5$) and modified with 2 to 15 atomic percent by weight zinc ions as expressed as Zn/Fe where said particles have been derived from a particulate acicular magnetic iron oxide precursor which comprises a particulate crystal expressed by the formula FeOx ($1.0 < x < 1.33$) and modified with 2 to 15 atomic percent by weight zinc ions as expressed as Zn/Fe.

In another embodiment of the present invention there is provided such acicular ferromagnetic iron oxide particles as above where the particles have a saturation magnetization of 90 emu/g or more.

In still another embodiment of the present invention there is provided a process for producing acicular ferromagnetic iron oxide particles comprising crystalline particles having an aspect ratio not lower than 4, expressed by the formula FeOx ($1.33 \leq x < 1.5$) and modified with 2 to 15 atomic percent by weight zinc ions as expressed as Zn/Fe, which comprises the step of oxidizing a particulate acicular magnetic iron oxide, which comprises a particulate crystal expressed by the formula of FeOx ($1.0 < x < 1.33$) and modified with 2 to 15 atomic percent by weight zinc ions as expressed as Zn/Fe, at a temperature of 50° to 250° C.

In still another embodiment of the present invention there is provided such a process for producing acicular ferromagnetic iron oxide particles as described immediately above where the particles have a saturation magnetization of 90 emu/g or more.

In still another embodiment of the present invention there is provided a process for producing acicular ferromagnetic iron oxide particles comprising crystalline particles of an aspect ratio not lower than 4 expressed by the formula FeOx ($1.33 \leq x < 1.5$) and modified with 2 to 15 atomic percent by weight zinc ions as expressed as Zn/Fe, which comprises the steps of oxidizing a particulate acicular magnetic iron oxide, which comprises a particulate crystal expressed by the formula of FeOx ($1.0 < x < 1.33$) and modified with 2 to 15 atomic percent by weight zinc ions as expressed as Zn/Fe, at a temperature of 50° to 250° C. followed by subjecting to an immersion-treatment in an acidic solution or an alkaline solution.

In still another embodiment of the present invention there is provided such a process for producing acicular ferromagnetic iron oxide particles as described immediately above where the particles have a saturation magnetization of 90 emu/g or more, In still another embodiment of the present invention there is provided acicular ferromagnetic iron oxide particles containing cobalt which comprises the crystalline nucleus of the acicular ferromagnetic iron oxide particles having an aspect ratio not lower than 4, expressed by the formula FeOx ($1.33 \leq x < 1.5$) and modified with 2 to 15 atomic percent by weight zinc ions as expressed as Zn/Fe, said crystalline nucleus being derived from a particulate acicular magnetic iron oxide precursor which comprises a particulate crystal expressed by the formula of FeOx ($1.0 < x < 1.33$) and modified with 2 to 15 atomic percent by weight zinc ions as expressed as Zn/Fe.

In still another embodiment of the present invention there is provided acicular ferromagnetic iron oxide particles containing cobalt which comprises the crystalline nucleus of the acicular ferromagnetic iron oxide particles having an aspect ratio not lower than 4 and a saturation magnetization of 90 emu/g or more, expressed by the formula FeOx ($1.33 \leq x < 1.5$) and modified with 2 to 15 atomic percent by weight zinc ions as expressed as Zn/Fe, said crystalline nucleus being derived from a particulate acicular magnetic iron oxide precursor which comprises a particulate crystal expressed by the formula of FeOx ($1.0 < x < 1.33$) and modified with 2 to 15 atomic percent by weight zinc ions as expressed as Zn/Fe.

In still another embodiment of the present invention there is provided such acicular ferromagnetic iron oxide particles containing cobalt as described immediately above which have a saturation magnetization of 90 emu/g or more.

In still another embodiment of the present invention there is provided a process for producing acicular ferromagnetic iron oxide particles containing cobalt which comprise crystalline particles expressed by the formula FeOx ($1.33 \leq x < 1.5$) and modified witch 2 to 15 atomic percent by weight zinc ions as expressed as Zn/Fe, which comprises the step of treating an acicular ferromagnetic iron oxide particle, which comprises a particulate crystal having an aspect ratio not lower than 4, expressed by the formula of FeOx ($1.33 \leq x < 1.5$) and modified with 2 to 15 atomic percent by weight zinc ions as expressed as Zn/Fe, with a cobalt compound or a combination of a cobalt compound and a ferrous compound.

In still another embodiment of the present invention there is provided a process for producing acicular ferromagnetic iron oxide particles containing cobalt which comprise crystalline particles having a saturation magnetization of 90 emu/g or more, expressed by the formula of FeOx ($1.33 \leq x < 1.5$) and modified with 2 to 15 atomic percent by weight zinc ions as expressed as Zn/Fe, which comprises the step of treating an acicular ferromagnetic iron oxide particle, which comprises a particulate crystal having an aspect ratio not lower than 4 and a saturation magnetization of 90 emu/g or more expressed by the formula of FeOx ($1.33 \leq x < 1.5$) and modified with 2 to 15 atomic percent by weight zinc ions as expressed as Zn/Fe, with a cobalt compound or a combination of a cobalt compound and a ferrous compound.

In still another embodiment of the present invention there is provided a process for producing acicular ferromagnetic iron oxide particles containing cobalt which comprise crystalline particles expressed by the formula FeOx ($1.33 \leq x < 1.5$) and modified with 2 to 15 atomic percent by weight zinc ions as expressed as Zn/Fe, which comprises the steps of subjecting an acicular ferromagnetic iron oxide particle, which comprises a particulate crystal having an aspect ratio not lower than 4, expressed by the formula of FeOx ($1.33 \leq x < 1.5$) and modified with 2 to 15 atomic percent by weight zinc ions as expressed as Zn/Fe, to an immersion-treatment in a acidic solution or an alkaline solution, followed by treating with a cobalt compound or a combination of a cobalt compound and a ferrous compound.

In still another embodiment of the present invention there is provided a process for producing acicular ferromagnetic iron oxide particles containing cobalt which comprise crystalline particles having a saturation magnetization of 90 emu/g or more, expressed by the formula FeOx ($1.33 \leq x < 1.5$) and modified with 2 to 15 atomic percent by weight zinc ions as expressed as Zn/Fe, which comprises the steps of subjecting an acicular ferro magnetic iron oxide particle, which comprises a particulate crystal having an aspect ratio not lower than 4 and a saturation magnetization of 90 emu/g or more expressed by the formula of FeOx ($1.33 \leq x < 1.5$) and modified with 2 to 15 atomic percent by weight zinc ions as expressed as Zn/Fe, to an immersion-treatment in a acidic solution or an alkaline solution, followed by treating with a cobalt compound or a combination of a cobalt compound and a ferrous compound.

In still another embodiment of the present invention there is provided acicular magnetic iron oxide particles comprising crystalline particles expressed by the formula FeOx ($1.0 < x < 1.33$) and modified with 2 to 15 atomic percent by weight zinc ions as expressed as Zn/Fe.

In still another embodiment of the present invention there is provided such acicular magnetic iron oxide particles as described immediately above which have a saturation magnetization of 90 emu/g or more.

In still another embodiment of the present invention there is provided a process for producing acicular magnetic iron oxide particles comprising crystalline particles expressed by the formula FeOx ($1.0 < x < 1.33$) and modified with 2 to 15 atomic percent by weight zinc ions as expressed as Zn/Fe, which comprises the steps of (a) heating acicular hydrous iron oxide particles containing a zinc component at a temperature of 300° to 750° C. to dehydrate the particles, reducing the dehydrated particles at a temperature of 300° to 500° C., and then heat-treating the reduced particles at a temperature of 400° to 700° C. in an inert atmosphere, or (b) reducing acicular iron oxide particles containing a zinc component at a temperature of 300° to 500° C., and then heat-treating the reduced particles at a temperature of 400° to 700° C. in an inert atmosphere, or (c) heat-treating acicular iron oxide particles expressed by the formula FeOx ($1.0 < x < 1.33$) containing a zinc component at a temperature of 400° to 700° C. in an inert atmosphere.

In still another embodiment of the present invention there is provided such a process for producing acicular magnetic iron oxide particles as described immediately above which have a saturation magnetization of 90 emu/g or more.

According to the present invention, the acicular magnetic iron oxide particles crystalline particles expressed by the formula FeOx ($1.0 < x < 1.33$) and modified with 2 to 15 atomic percent by weight zinc ions as expressed as Zn/Fe may be produced (a) by heating and dehydrating acicular hydrous iron oxide, for example, iron oxyhydrate such as goethite ($\alpha$-FeOOH), acagenite ($\beta$-FeOOH), or lepidocrosite ($\gamma$-FeOOH), containing a zinc component at a temperature of 300° to 750° C., then reducing the dehydrate at a temperature of 300° to 500° C., and subjecting the reduced particles to heat-treatment at a temperature of 400° to 700° C. in an inert atmosphere, or (b) by reducing acicular iron oxide particles, for example, hematite ($\alpha$-Fe$_2$O$_3$), magnetite (Fe$_3$O$_4$), maghemite ($\gamma$-Fe$_2$O$_3$), berthollide (FeOx; $1.33 < x < 1.5$: that is, an intermediate oxide between magnetite and maghemite), containing a zinc component at a temperature of 300° to 500° C., and thereafter subjecting the reduced particles to heat-treatment at a temperature of 400° to 700° C. in an inert atmosphere, or (c) by subjecting acicular magnetic iron oxide particles expressed by the formula FeOx ($1.0 < x < 1.33$) containing a zinc component to heat-treatment at a temperature of 400° to 700° C. in an inert atmosphere.

In case acicular hydrous iron oxide particles are used, the zinc component may be ① added in production of the acicular hydrous iron oxide, or ② added to or coated on the acicular hydrous iron oxide particles. In case zinc-containing acicular iron oxide particles are used, the zinc component may be added to or coated on ③ hematite particles which can be obtained by heating and dehydrating acicular hydrous iron oxide particles at a temperature of 300° to 750° C., or to hydrothermal treatment, or ④ magnetite particles which can be obtained by reducing hematite particles at a temperature of 300° to 500° C., or ⑤ particulate berthollide particles which are intermediate oxides between magnetite and maghemite, or ⑥ maghemite particles which can be obtained by oxidizing magnetite particles at a temperature of 100° to 500° C. Alternatively, in case acicular magnetic iron oxide particles expressed by the formula FeOx ($1.0 < x < 1.33$) containing a zinc component are used, the zinc component may be added to or coated on ⑦ the acicular magnetic iron oxide particles generally under non-oxidizing atmosphere, or it may be effected under oxidizing atmosphere so far as the x is retained in the range of below 1.33. Moreover, an addition of a sintering inhibitor such as phosphorus compounds, silicon compounds, aluminum compounds and the like may be added in the heating and dehydrating of the hydrous iron oxide or in the reduction of iron oxide such as hematite to avoid deformation of particle configuration and particle sintering, thereby allowing the effects of the present invention to be further enhanced. An amount of the sintering inhibitor to be added is not critical, but depending upon the size of particles of the hydrous iron oxide and hematite, ranges from 0.1 to 5 atomic percent by weight as each metallic element based on the Fe content of the particulate substrate. Two or more of the aforementioned sintering inhibitors may be used and an amount thereof to be added in such case is 0.3 to 5 atomic percent by weight as a total of metallic elements.

The zinc compounds which may be used as the aforementioned zinc component includes various zinc compounds such as chlorides, sulfates, and nitrates. An amount of the zinc component to be added is such that the $FeOx$ ($1.33 \leq x < 1.5$) particles modified with zinc ions or after the immersion treatment of the particles in an acidic solution or an alkaline solution contain 2 to 15 atomic percent by weight, preferably 2.5 to 10 atomic percent by weight zinc as expressed as Zn/Fe, which may be achieved by adding to the particles of hydrous iron oxide, iron oxide, or acicular iron oxide expressed by the formula $FeOx$ ($1.0 < x < 1.33$). A lower amount of the zinc component than the above range to be added does not lead to desired effects, whereas a higher amount leads to a reduction in saturation magnetization. The addition of the zinc component in the cases ② to ⑦ as above may be conducted by adding a zinc compound to an aqueous suspension or a wet cake of the treated hydrous iron oxide particles or iron oxide particles and drying the aqueous suspension or cake to dryness, or by adding a zinc compound to an aqueous suspension and further adding an alkali to precipitate zinc hydroxides on the treated particles resulting in the coated particles.

Then, [I] the hydrous iron oxide particles containing a zinc component as prepared as above are subjected to heating and dehydrating. The heating and dehydrating can be conducted by heating the particles generally in a non-reducing atmosphere, for example, in an atmosphere of oxygen containing gases, most generally in air at a temperature of 300° to 750° C., preferably 350° to 700° C., usually for about 0.5 to 10 hours. Thereafter, the dehydrated particles are reduced in a reducing atmosphere, for example, in an atmosphere of hydrogen gas at a temperature of 300° to 500° C., and then heated in an inert atmosphere, for example, in an atmosphere of nitrogen gas at a temperature of 400° to 700° C. for about 0.5 to 10 hours. [II] the reduction-treatment of the iron oxide particles containing a zinc component can be conducted by reducing the particles in a reducing atmosphere, for example, in an atmosphere of hydrogen gas at a temperature of 300° to 500° C., and then heated in an inert atmosphere, for example, in an atmosphere of nitrogen gas at a temperature of 400° to 700° C. for about 0.5 to 10 hours. [III] the heat-treatment of the acicular iron oxide particles expressed by the formula $FeOx$ ($1.0 < x < 1.33$) containing a zinc component can be conducted by heating the particles in an inert atmosphere, for example, in an atmosphere of nitrogen gas at a temperature of 400° to 700° C. for about 0.5 to 10 hours.

If the temperature of the heating and dehydrating in the process [I] is much lower than the above defined ranges, there may be undesirably formed voids after water was released, whereas if it is much higher, there may be undesirably caused sintering. If the temperature of the reduction-treatment in the process [I] or [II] is much lower than the above defined ranges, there may be undesirably remained partly hematite due to insufficient reduction and attained no desired enhancement in the saturation magnetization by modification with zinc, whereas if it is much higher, there may be undesirably caused sintering.

If the temperature of the heat-treatment in the process [I] to [III] is much lower than the above defined ranges, there may be attained no desired enhancement in the saturation magnetization by modification with zinc, whereas if it is much higher, there may be undesirably caused sintering.

Then, in order to produce acicular ferromagnetic iron oxide particles comprising crystalline particles expressed by the formula $FeOx$ ($1.33 \leq x < 1.5$) modified with a specific amount of zinc ions, acicular magnetic iron oxide particles comprising crystalline particles expressed by the formula $FeOx$ ($1.0 < x < 1.33$) modified with a specific amount of zinc ions are subjected to dry or wet oxidation-treatment in an oxidizing substance, most commonly air at a temperature of 50° to 250° C.

The thus produced acicular ferromagnetic iron oxide particles have been found to be berthollide particles comprising crystalline particles modified with zinc ions and ferrous ions where the zinc and ferrous ions are diffused into the particles as can be seen from the distribution of the ions determined by the acid dissolution method.

When the acicular magnetic iron oxide particles expressed by the formula $FeOx$ ($1.0 < x < 1.33$) are used as starting materials, for the purpose of imparting more desirable magnetic properties to the end acicular ferromagnetic iron oxide particles, it is preferably to employ $x > 1.25$, more preferably $x > 1.30$ taking account of various production conditions such as the reduction in the process of preparing the starting materials and the oxidation in the process of producing the end products.

The acicular ferromagnetic iron oxide particles in accordance with the present invention may be further subjected to immersion-treatment in an acidic solution (e.g., an aqueous solution of sulfuric acid, acetic acid, or the like) or an alkaline solution (e.g., an aqueous solution of alkali hydroxides, ammonia, or the like) to remove nonmagnetic components such as unreacted zinc oxide and the like, or subjected to particle surface modification in order to achieve less fluctuation of quality, an additional improvement in saturation magnetization, and a more enhanced coercive force to be exhibited by cobalt-containing ferromagnetic iron oxide particles which are produced with the above iron oxide particles.

The acicular ferromagnetic iron oxide particles in accordance with the present invention may be treated with a cobalt compound or both a cobalt compound and a ferrous compound to give them better coercive force and saturation magnetization. To such treatments, any one of various known methods can be applied and it may be surface modification or solid solutions. For example, the berthollide particles modified with zinc ions may be used as substrates and dispersed in an alkaline solution to produce an aqueous alkaline dispersion in which the cobalt compound or both the cobalt and the ferrous compounds are reacted. Such process can be carried out by selecting appropriately the way of addition, treating temperature, concentration of alkali, and treating atmosphere. The content of cobalt is generally 0.5 to 10 at. % by weight, preferably 1 to 8 at. % by weight as Co, and the content of ferrous metal is 0 to 25 at. % by weight, preferably 0 to 18 at. % by weight as $Fe^{2+}$ based on the content of Fe of the particulate substrate.

After the treatment with cobalt, the dispersion may be generally filtered, washed to remove alkali, and then the wet cake is dried.

Alternatively, in the present invention the dispersion may be heated in the presence of alkali immediately after the treatment with cobalt and then filtered, washed to remove alkali, and thereafter the resulting wet cake may be dried. In this case, this heat-treatment may be performed immediately without conducting the aging in the treatment with cobalt. The heat-treatment may be performed by heating the slurry after the treatment with cobalt at a temperature of 50° C. or higher for 1 to 10 hours. In case heating at boiling point or higher is employed, the slurry after the treatment with cobalt may be placed and treated in a tightly closed vessel, e.g., an autoclave. The heat-treatment is preferably effected at a temperature in the range of not higher than 200° C. in industry In the present invention, the wet cake obtained by ordinary methods prior to drying may be wet heated to achieve a more improvement in magnetic properties. In this case, the wet heating may be performed by placing the wet cake in a tightly closed vessel, e.g., an autoclave and heating usually at a temperature of 60° to 200° C., preferably 80° to 150° C. for 1 to 10 hours.

Moreover, in the present invention, the wet cake prior to drying may be redispersed in an aqueous solution to form an aqueous slurry which is heated to achieve an effect of a greater improvement in magnetic properties. Such heat-treatment may be performed by placing the slurry in a tightly closed vessel, e.g., an autoclave and heating usually at a temperature of 160° C. or lower, preferably 80° to 150° C. for 1 to 10 hours.

The drying may be carried out in an inert atmosphere, or in an atmosphere of air, in an atmosphere of mixture of air and an inert gas. The products produced by drying in a non-oxidizing atmosphere appear to be generally excellent in exhibition of coercive force as compared with those produced by drying in an oxidizing atmosphere. The drying temperatures may be those ordinarily used in industry. Generally about 60° to 150° C. are used.

In this way there are produced the acicular ferromagnetic iron oxide particles containing cobalt having desired characteristics whose coercive force and other magnetic properties may be improved by conducting further a dry heat-treatment at a temperature of 100° to 200° C.

Moreover, the cobalt-containing acicular ferromagnetic iron oxide particles obtained by effecting the aforementioned treatment with cobalt may be coated on the surfaces of the particles with compounds of silicon, aluminum, calcium, titaniumm, vanadium, nickel, zinc, and phosphorus to allow production of acicular ferromagnetic iron oxide particles having a combination of a desired stability with time ($\Delta Hc$) and a fatty acid-adsorbing property (a quantity of $C_{14}$ adsorbed) as well as the excellent magnetic properties of the aforementioned acicular ferromagnetic iron oxide particles, according to the process disclosed in Japanese Patent KOKAI (Laid-open) No. Sho 63-303817.

The acicular ferromagnetic iron oxide particles (berthollide particles) or the starting materials thereof, acicular magnetic iron oxide particles (FeOx; $1.0<x<1.33$) according to the present invention have a higher saturation magnetization than those of acicular berthollide particles and acicular magnetite particles modified zinc ions. Although the reason of such fact has not been necessarily clarified yet, it may be postulated that the acicular magnetic iron oxide particles expressed by the formula FeOx ($1.0<x<1.33$) according to the present invention have a higher ratio of ferrous ions as compared with those of the aforementioned acicular berthollide particles and acicular magnetite particles, which influences the modification with zinc ions in the crystalline particles resulting in an enhancement in saturation magnetization.

In the present invention, metallic ions such as, for example, (1) manganese came from the ferrous sulfate as a source for goethite, (2) calcium, magnesium and tin added as shape controlling agents to goethite, and (3) nickel, calcium, and silicon added to impart thermal stability to acicular iron oxide particles may be included in the products without diminishing the effects of the present invention.

The present invention will be further illustrated with reference to the following examples and comparative examples.

EXAMPLE 1

200 g of acicular magnetic iron oxide particles (FeOx; x=1.30; Coercive force, 394 Oe; Saturation magnetization, 84.5 emu/g; Average maximum particle size, 0.28 μm; Aspect ratio, about 10; $Fe^{2+}/Fe^{3+}=0.65$) were dispersed in 2 liters of water to form a slurry, to which 200 ml of an aqueous solution of 0.18 mol of zinc sulfate dissolved in water was added with stirring while maintaining the dispersion at 30° C. in an atmosphere of nitrogen gas, and then a 1N aqueous solution of sodium hydroxide was added to pH 9.5. Then the slurry was brought about to 70° C. and aged for 2 hours while maintaining a constant pH with a diluted aqueous solution of sodium hydroxide. After completion of ageing, the slurry was filtered and washed with water to produce a wet cake which was dried at 120° C. in a tubular furnace under an atmosphere of nitrogen gas. Thereafter, the dried cake was heat treated in the same atmosphere at 600° C. for one hour. Acicular magnetic iron oxide particles (FeOx; x=1.30) modified with 8.0% by weight zinc based on the content of Fe in the crystalline particles (chemically analyzed values) were obtained (Sample No. 1).

Then, 100 g of the acicular magnetic iron oxide particles were dispersed in 1 liter of water to produce a slurry which was wet-treated by oxidation in an atmosphere of oxygen gas while maintaining the temperature of the slurry at 80° C. When the ratio $Fe^{2+}/Fe^{3+}$ reached 0.29, the blowing gas was changed from oxygen to nitrogen and the temperature of the slurry was lowered to room temperature. After cooled, the slurry was filtered, washed with water, and dried at a temperature of 100° C. under an atmosphere of nitrogen gas to produce the end acicular ferromagnetic iron oxide particles (Sample No. 2).

EXAMPLE 2

A volume of the slurry of $Fe^{2+}/Fe^{3+}$ of 0.29 obtained as in Example 1 was prepared with water to 1 liter, to which 196 ml of a 10 mol/l aqueous solution of sodium hydroxide were added while maintaining the temperature of the slurry at room temperature, and in addition 140 ml of a 0.85 mol/l aqueous solution of cobalt sulfate and 140 ml of a 0.90 mol/l aqueous solution of ferrous sulfate were added. After completion of the addition, the slurry was aged for one hour with stirring, then raised to 70° C. and further aged for 4 hours with stirring. After completion of ageing, the slurry was filtered and washed with water to produce a cake. The cake was redispersed into water to produce a dispersion which was subjected to heat-treatment at 145° C. in an autoclave swept with nitrogen gas for 3 hours. After cooled, the slurry was filtered, washed with water, and dried at 100° C. in an atmosphere of nitrogen gas to produce the end acicular ferromagnetic iron oxide particles containing cobalt (Sample No. 3).

EXAMPLE 3

The slurry was treated in the same manner as in Example 1, except that the wet oxidation treatment in an atmosphere of oxygen gas was performed until the ratio $Fe^{2+}/Fe^{3+}$ reached 0.34, 0.25, and 0.22, respectively, to produce the end acicular ferromagnetic iron oxide particles (Sample Nos. 4, 5, and 6).

EXAMPLE 4

The slurry was treated in the same manner as in Example 2, except that the slurry was changed to the slurry obtained in Example 3, to produce the end acicular ferromagnetic iron oxide particles containing cobalt (Sample Nos. 7, 8, and 9).

COMPARATIVE EXAMPLE 1

The slurry was treated in the same manner as in Example 1, except that the heat-treatment in an atmosphere of nitrogen gas was omitted and that the wet oxidation treatment in an atmosphere of oxygen gas was performed until the ratio $Fe^{2+}/Fe^{3+}$ reached 0.30, to produce the end acicular ferromagnetic iron oxide particles (Sample No. 10).

COMPARATIVE EXAMPLE 2

The slurry of $Fe^{2+}/Fe^{3+}$ of 0.30 obtained as in Comparative Example 1 was used and treated in the same manner as in Example 2 to produce the end acicular ferromagnetic iron oxide particles containing cobalt (Sample No. 11).

COMPARATIVE EXAMPLE 3

The slurry was treated in the same manner as in Example 1, except that no zinc sulfate was added to the acicular magnetic iron oxide particles and that the wet oxidation treatment in an atmosphere of oxygen gas was performed until the ratio $Fe^{2+}/Fe^{3+}$ reached 0.28, to produce the end acicular ferromagnetic iron oxide particles (Sample No. 12).

COMPARATIVE EXAMPLE 4

The slurry of $Fe^{2+}/Fe^{3+}$ of 0.28 obtained as in Comparative Example 3 was used and treated in the same manner as in Example 2 to produce the end acicular ferromagnetic iron oxide particles containing cobalt (Sample No. 13).

COMPARATIVE EXAMPLE 5

The slurry was treated in the same manner as in Example 1, except that the heat-treatment in an atmosphere of nitrogen gas was performed at 750° C. and that the wet oxidation treatment in an atmosphere of oxygen gas was performed until the ratio $Fe^{2+}/Fe^{3+}$ reached 0.28, to produce the end acicular ferromagnetic iron oxide particles (Sample No. 14).

COMPARATIVE EXAMPLE 6

The slurry of $Fe^{2+}/Fe^{3+}$ of 0.28 obtained as in Comparative Example 5 was used and treated in the same manner as in Example 2 to produce the end acicular ferromagnetic iron oxide particles containing cobalt (Sample No. 15).

COMPARATIVE EXAMPLE 7

The slurry was treated in the same manner as in Example 1, except that the heat-treatment in an atmosphere of nitrogen gas was performed at 300° C. and that the wet oxidation treatment in an atmosphere of oxygen gas was performed until the ratio $Fe^{2+}/Fe^{3+}$ reached 0.28, to produce the end acicular ferromagnetic iron oxide particles (Sample No. 16).

COMPARATIVE EXAMPLE 8

The slurry of $Fe^{2+}/Fe^{3+}$ of 0.28 obtained as in Comparative Example 7 was used and treated in the same manner as in Example 2 to produce the end acicular ferromagnetic iron oxide particles containing cobalt (Sample No. 17).

EXAMPLE 5

The slurry was treated in the same manner as in Example 1, except that the wet oxidation treatment in an atmosphere of oxygen gas was performed until the ratio $Fe^{2+}/Fe^{3+}$ reached 0.35, to produce the end acicular ferromagnetic iron oxide particles (Sample No. 18).

EXAMPLE 6

The slurry was treated in the same manner as in Example 2, except that the slurry was changed to the slurry obtained in Example 5 and that only 140 ml of a 0.85 mol/l aqueous solution of cobalt sulfate were added in place of the addition of the aqueous solution of cobalt sulfate and the aqueous solution of ferrous sulfate, to produce the end acicular ferromagnetic iron oxide particles containing cobalt (Sample No. 19).

EXAMPLE 7

The slurry was treated in the same manner as in Example 1, except that the amount of Zn for the modification based on the Fe content in the crystalline particles was to be 14% by weight (value by chemical analysis) and that the wet oxidation treatment in an atmosphere of oxygen gas was performed until the ratio $Fe^{2+}/Fe^{3+}$ reached 0.25, to produce the end acicular ferromagnetic iron oxide particles (Sample No. 20).

EXAMPLE 8

The slurry was treated in the same manner as in Example 2, except that the slurry was changed to the slurry obtained in Example 7, to produce the end acicular ferromagnetic iron oxide particles containing cobalt (Sample No. 21).

EXAMPLE 9

The slurry was treated in the same manner as in Example 1, except that the amount of Zn for the modification based on the Fe content in the crystalline particles was to be 3.0% by weight (value by chemical analysis) and that the heat-treatment in an atmosphere of nitrogen gas was performed at a temperature of 680° C. and that the wet oxidation treatment in an atmosphere of oxygen gas was performed until the ratio $Fe^{2+}/Fe^{3+}$ reached 0.30, to produce the end acicular ferromagnetic iron oxide particles (Sample No. 22).

EXAMPLE 10

The slurry was treated in the same manner as in Example 2, except that the slurry was changed to the slurry obtained in Example 9, to produce the end acicular ferromagnetic iron oxide particles containing cobalt (Sample No. 23).

EXAMPLE 11

The slurry was treated in the same manner as in Example 9, except that the acicular magnetic iron oxide particles prior to the zinc modification were conditioned to make the ratio of $Fe^{2+}/Fe^{3+}$ 0.53 and that the wet oxidation treatment in an atmosphere of oxygen gas after the modification treatment with zinc was performed until the ratio $Fe^{2+}/Fe^{3+}$ reached 0.29, to produce the end acicular ferromagnetic iron oxide particles. (Sample No. 24).

EXAMPLE 12

The slurry was treated in the same manner as in Example 2, except that the slurry was changed to the slurry obtained in Example 11, to produce the end acicular ferromagnetic iron oxide particles: containing cobalt (Sample No. 25).

COMPARATIVE EXAMPLE 9

The slurry was treated in the same manner as in Example 11, except that the acicular magnetic iron oxide particles prior to the zinc modification were conditioned to make the ratio of $Fe^{2+}/Fe^{3+}$ 0.45 and that the wet oxidation treatment in an atmosphere of oxygen gas after the modification treatment with zinc was performed until the ratio $Fe^{2+}/Fe^{3+}$ reached 0.30, to produce the end acicular ferromagnetic iron oxide particles (Sample No. 26).

COMPARATIVE EXAMPLE 10

The slurry was treated in the same manner as in Example 2, except that the slurry was changed to the slurry obtained in Comparative Example 9, to produce the end acicular ferromagnetic iron oxide particles containing cobalt (Sample No. 27).

EXAMPLE 13

The slurry was treated in the same manner as in Example 1, except that in place of the wet oxidation treatment in an atmosphere of oxygen gas after the modification treatment with zinc, the dry oxidation treatment was performed in an atmosphere of a gaseous mixture of air/nitrogen gas=1/5 in an tubular furnace until the ratio $Fe^{2+}/Fe^{3+}$ reached 0.28, to produce the end acicular ferromagnetic iron oxide particles (Sample No. 28).

EXAMPLE 14

The slurry was treated in the same manner as in Example 2, except that the slurry was replaced by the slurry prepared by dispersing the particles obtained Example 13 into 1 liter of water, to produce the end acicular ferromagnetic iron oxide particles containing cobalt (Sample No. 29).

EXAMPLE 15

The slurry was treated in the same manner as in Example 1, except that the wet oxidation treatment in an atmosphere of oxygen gas was performed until the ratio $Fe^{2+}/Fe^{3+}$ reached 0.30, to produce the end acicular ferromagnetic iron oxide particles (Sample No. 30).

EXAMPLE 16

The slurry was treated fin the same manner as in Example 2, except that the slurry was replaced by the slurry obtained Example 15 and that the slurry after completion of ageing was filtered and washed with water to produce a wet cake which was treated in an autoclave at 140° C. for 5 hours, to produce the end acicular ferromagnetic iron oxide particles containing cobalt (Sample No. 31).

EXAMPLE 17

The slurry was treated in the same manner as in Example 1, except that the wet oxidation treatment in an atmosphere of oxygen gas was performed until the ratio $Fe^{2+}/Fe^{3+}$ reached 0.29, to produce the end acicular ferromagnetic iron oxide particles (Sample No. 32).

EXAMPLE 18

The slurry was treated in the same manner as in Example 2, except that the slurry was replaced by the slurry obtained Example 17 and that the slurry after completion of ageing was directly subjected to heat-treatment in an autoclave without filtering and washing with water, to produce the end acicular ferromagnetic iron oxide particles containing cobalt (Sample No. 33).

EXAMPLE 19

The slurry was treated in the same manner as in Example 1, except that the wet oxidation treatment in an atmosphere of oxygen gas was performed until the ratio $Fe^{2+}/Fe^{3+}$ reached 0.30, to produce the end acicular ferromagnetic iron oxide particles (Sample No. 34).

EXAMPLE 20

The slurry was treated in the same manner as in Example 2, except that the slurry was replaced by the slurry obtained Example 19 and that the slurry after completion of ageing was filtered, washed with water, and dried at 120° C. in an atmosphere of nitrogen gas, and thereafter subjected to dry heat-treatment in a tubular furnace under a nitrogen atmosphere at 150° C. for three hours instead of the heat-treatment in an autoclave of the slurry after completion of ageing, to produce the end acicular ferromagnetic iron oxide particles containing cobalt (Sample No. 35).

EXAMPLE 21

200 g of acicular α-FeOOH particles (Average maximum particle size, 0.30 μm; Aspect ratio, about 14; Specific surface area, about 60 m²/g) were dispersed in 2 liters of water to form a slurry, to which 200 ml of an aqueous solution of 0.15 mol of zinc sulfate dissolved in water was added while maintaining the dispersion at 30° C., and then a 1N aqueous solution of sodium hydroxide was added to pH 9.5. Then the slurry was brought about to 90° C. and aged for 3 hours while maintaining a constant pH with a diluted aqueous solution of sodium hydroxide. After completion of ageing, an aqueous solution of sodium silicate was added to 0.5% Si based on the weight of Fe and then a diluted aqueous solution of sulfuric acid was dropwise added until pH reached 7. After an additional one hour of ageing, the slurry was filtered and washed with water to produce a wet cake which was dried at 100° C., and then subjected to thermal dehydration in a tubular furnace under an atmosphere of air at a temperature of 600° C. for 2 hours. After cooling, the tubular furnace was swept with nitrogen gas and the dehydrate was reduced under a flow of hydrogen gas at 420° C. for two hours. Thereafter, the reduced particles were subjected to heat-treatment at 550° C. in an atmosphere of nitrogen gas for one hour to produce acicular magnetic iron oxide particles (FeOX; x=1.32) modified with zinc (Zn/Fe= 7.5 wt. %).

The acicular magnetic iron oxide particles obtained as above were taken out in a glovebox under an atmosphere of nitrogen gas, and measured for saturation magnetization with a VSM apparatus manufactured by TOEI KOGYO. The result was 93.7 emu/g (magnetic field applied; 10 KOe).

Then, 100 g of the thus obtained acicular magnetic iron oxide particles were dispersed in one liter of water to produce a slurry which was subjected to wet-oxidation in an atmosphere of oxygen gas while maintaining the temperature of the slurry at 80° C. When the ratio $Fe^{2+}/Fe^{3+}$ reached 0.30, the blowing gas was changed from oxygen to nitrogen and the temperature of the slurry was lowered to room temperature. After cooled, the volume of the slurry was prepared with water to one liter. While maintaining the temperature of the slurry at room temperature, to the slurry were added 196 ml of a 10 mol/l aqueous solution of sodium hydroxide, then added further 140 ml of a 0.85 mol/l aqueous solution of cobalt sulfate and 140 ml of a 0.90 mol/l aqueous solution of ferrous sulfate. After completion of the additions, the slurry was aged for one hour with stirring, then raised to 80° C. and further aged for 4 hours with stirring. After completion of ageing, the slurry was filtered and washed with water to produce a wet cake. The cake was redispersed into water to produce a dispersion which was subjected to heat-treatment at 145° C. for 4 hours in an autoclave swept with nitrogen gas. After cooled, the slurry was filtered, washed with water, and dried at 120° C. in an atmosphere of nitrogen gas to produce the end acicular ferromagnetic iron oxide particles containing cobalt (Sample No. 36).

The acicular ferromagnetic iron oxide particles produced by drying the slurry prior to the treatment with cobalt in Example 21 according to the present invention had a coercive force of 380 Oe and a saturation magnetization of 92.8 emu/g.

EXAMPLE 22

200 g of acicular $\alpha$-$Fe_2O_3$ particles (Average maximum particle size, 0.29 μm; Aspect ratio, about 11; Specific surface area, about 33 $m^2/g$) were dispersed in 2 liters of water to form a slurry. While maintaining the slurry at 30° C., to the slurry were added 200 ml of an aqueous solution of 0.16 mol of zinc sulfate dissolved in water, and then a 1N aqueous solution of sodium hydroxide until pH reached 9.5. Then the slurry was brought about to 90° C. and aged for 3 hours while maintaining a constant pH with a diluted aqueous solution of sodium hydroxide. After completion of ageing, the slurry was filtered and washed with water to produce a wet cake which was dried at 100° C., and then reduced in a tubular furnace under a flow of hydrogen gas at 420° C. for 2 hours. Thereafter, the reduced particles were subjected to heat-treatment at 550° C. in an atmosphere of nitrogen gas for one hour to produce acicular magnetic iron oxide particles (FeOx; x=1.33) modified with zinc (Zn/Fe= 7.5 wt. %).

The acicular magnetic iron oxide particles obtained as above were measured for saturation magnetization as in Example 21 resulting in 94.0 emu/g.

Then, the obtained particles were treated in the same manner as in Example 21, except that when the ratio of $Fe^{2+}/Fe^{3+}$ reached 0.31, the blowing gas was changed from oxygen to nitrogen, to produce the end acicular ferromagnetic iron oxide particles containing cobalt (Sample No. 37).

The acicular ferromagnetic iron oxide particles produced by drying the slurry prior to the treatment with cobalt in Example 22 according to the present invention had a coercive force of 384 Oe and a saturation magnetization of 92.9 emu/g.

EXAMPLE 23

The acicular ferromagnetic iron oxide particles obtained in Example 1 were dispersed in a 0.1N aqueous solution of sulfuric acid to produce a slurry of 100 g/l, and subjected to immersion-treatment at 25° C. for 5 hours with stirring. Then the slurry was filtered and washed with water to produce a wet cake which was redispersed into one liter of water and treated with cobalt in a manner as in Example 2 to produce acicular ferromagnetic iron oxide particles containing cobalt (Sample No. 38).

All the samples No. 1 to 38 in Examples and Comparative Examples as above were measured in the form particles by the ordinary method for magnetic properties [coercive force (Hc:Oe) and saturation magnetization ($\sigma$ s:emu/g) (magnetic field applied, 10 KOe)]. The sample No. 1 was taken out in the glovebox under an atmosphere of nitrogen gas and measured.

Moreover, measurements of specific surface area (BET:$m^2/g$), and aspect ratio with electron microphotographs (a long dimension and a short dimension of each of not less than 150 particles were measured and an arithmetical mean of the ratio or, the long dimension to the short dimension), and chemical analysis (an atomic percent of Zn based on the total Fe for all the samples, except Sample Nos. 12 and 13) were carried out. The results are shown in Table 1.

The acicular ferromagnetic iron oxide particles modified with zinc and those containing cobalt according to the present invention can be produced by an easily practicable method in industry, and have a higher saturation magnetization and stable magnetic properties. They are extremely suitable as materials for use in magnetically recording mediums of high density.

Furthermore, the acicular magnetic iron oxide particles modified with zinc according to the present invention can be produced by an easily practicable method in industry, and have a higher saturation magnetization. They are suitable as starting materials for production of the acicular ferromagnetic iron oxide particles modified with zinc which are extremely suitable as materials for use in magnetically recording mediums of high density because of having a higher saturation magnetization, coercive force and stable magnetic properties.

TABLE 1

| Example No. | Sample | Zn/total.Fe (at. % w/w) | $Fe^{2+}/Fe^{3+}$ (at. w/w) | Specific surface area ($m^2$/g) | Aspect ratio | FeOx x = | Magnetic properties | |
|---|---|---|---|---|---|---|---|---|
| | | | | | | | Hc | σs |
| Example 1 | 1 | 8.0 | 0.65 | 32.5 | 9 | 1.30 | 418 | 98.0 |
| Example 1 | 2 | 8.0 | 0.29 | 34.2 | 9 | 1.39 | 405 | 95.3 |
| Example 2 | 3 | 7.2 | 0.41 | 30.7 | 9 | 1.36 | 1069 | 94.9 |
| Example 3 | 4 | 8.0 | 0.34 | 34.3 | 9 | 1.37 | 409 | 96.3 |

TABLE 1-continued

| Example No. | Sample | Zn/total.Fe (at. % w/w) | Fe$^{2+}$/Fe$^{3+}$ (at. w/w) | Specific surface area (m$^2$/g) | Aspect ratio | FeOx x = | Magnetic properties Hc | σs |
|---|---|---|---|---|---|---|---|---|
| Example 3 | 5 | 8.0 | 0.25 | 34.1 | 9 | 1.40 | 402 | 93.5 |
| Example 3 | 6 | 8.0 | 0.22 | 34.0 | 9 | 1.41 | 396 | 91.6 |
| Example 4 | 7 | 7.2 | 0.46 | 30.6 | 9 | 1.34 | 1024 | 95.8 |
| Example 4 | 8 | 7.2 | 0.37 | 30.7 | 9 | 1.36 | 1086 | 93.2 |
| Example 4 | 9 | 7.2 | 0.34 | 30.5 | 9 | 1.37 | 1151 | 91.5 |
| Example 5 | 18 | 8.0 | 0.35 | 34.3 | 9 | 1.37 | 408 | 96.3 |
| Example 6 | 19 | 8.0 | 0.34 | 32.7 | 9 | 1.37 | 1012 | 90.7 |
| Example 7 | 20 | 14.0 | 0.25 | 32.7 | 9 | 1.40 | 394 | 92.6 |
| Example 8 | 21 | 12.4 | 0.38 | 29.5 | 9 | 1.36 | 1036 | 92.4 |
| Example 9 | 22 | 3.0 | 0.30 | 34.1 | 8 | 1.38 | 393 | 93.1 |
| Example 10 | 23 | 2.6 | 0.41 | 31.7 | 8 | 1.35 | 1085 | 92.8 |
| Example 11 | 24 | 3.0 | 0.29 | 34.2 | 8 | 1.39 | 389 | 92.2 |
| Example 12 | 25 | 2.6 | 0.41 | 31.9 | 8 | 1.35 | 1021 | 92.1 |
| Example 13 | 28 | 8.0 | 0.28 | 34.0 | 9 | 1.39 | 406 | 95.7 |
| Example 14 | 29 | 7.2 | 0.40 | 30.6 | 9 | 1.36 | 1092 | 95.2 |
| Example 15 | 30 | 8.0 | 0.30 | 34.2 | 9 | 1.38 | 405 | 96.0 |
| Example 16 | 31 | 7.2 | 0.42 | 30.7 | 9 | 1.35 | 1096 | 95.5 |
| Example 17 | 32 | 8.0 | 0.29 | 34.2 | 9 | 1.39 | 406 | 94.8 |
| Example 18 | 33 | 7.2 | 0.41 | 30.7 | 9 | 1.36 | 1103 | 94.4 |
| Example 19 | 34 | 8.0 | 0.30 | 34.1 | 9 | 1.38 | 405 | 96.3 |
| Example 20 | 35 | 7.2 | 0.42 | 30.7 | 9 | 1.35 | 1137 | 95.8 |
| Example 21 | 36 | 6.6 | 0.42 | 31.9 | 8 | 1.35 | 1051 | 92.6 |
| Example 22 | 37 | 6.6 | 0.43 | 31.1 | 8 | 1.35 | 1046 | 92.7 |
| Example 23 | 38 | 7.1 | 0.41 | 30.9 | 9 | 1.36 | 1093 | 95.8 |
| Comparative Example 1 | 10 | 8.0 | 0.30 | 36.6 | 10 | 1.38 | 380 | 77.0 |
| Comparative Example 2 | 11 | 2.1 | 0.41 | 33.1 | 10 | 1.35 | 759 | 78.1 |
| Comparative Example 3 | 12 | — | 0.28 | 36.0 | 9 | 1.39 | 385 | 81.6 |
| Comparative Example 4 | 13 | — | 0.39 | 32.9 | 9 | 1.36 | 1205 | 84.2 |
| Comparative Example 5 | 14 | 8.0 | 0.28 | 24.1 | 3 | 1.39 | 333 | 95.8 |
| Comparative Example 6 | 15 | 7.2 | 0.39 | 22.3 | 3 | 1.36 | 641 | 95.3 |
| Comparative Example 7 | 16 | 8.0 | 0.28 | 36.1 | 10 | 1.39 | 381 | 75.6 |
| Comparative Example 8 | 17 | 4.2 | 0.40 | 32.8 | 10 | 1.36 | 774 | 76.8 |
| Comparative Example 9 | 26 | 3.0 | 0.30 | 34.2 | 8 | 1.38 | 392 | 86.6 |
| Comparative Example 10 | 27 | 2.6 | 0.42 | 31.7 | 8 | 1.35 | 1079 | 87.5 |

What is claimed is:

1. A process for producing acicular ferromagnetic iron oxide particles comprising crystalline particles having an aspect ratio not lower than 4, a saturation magnetization of more than 90 emu/g, expressed by the formula of FeO$_x$, wherein, and modified with 2 to 15 atomic percent by weight zinc ions as expressed as Zn/Fe, which comprises the step of oxidizing a particulate acicular magnetic iron oxide, which comprises a particulate crystal expressed by the formula of FeOx, wherein, and modified with 2 to 15 atomic percent by weight zinc ions as expressed as Zn/Fe, at a temperature of 50° to 250° C.

2. A process for producing acicular magnetic iron oxide particles having a saturation magnetization of 90 emu/g or more, comprising crystalline particles expressed by the formula FeOx (1.0<x<1.33) and modified with 2 to 15 atomic percent by weight zinc ions as expressed as Zn/Fe, which comprises the steps of:

(a) heating and dehydrating acicular hydrous iron oxide particles containing a zinc component at a temperature of 300° to 750° C., reducing the dehydrated particles at a temperature of 300° to 500° C., and then heat-treating the reduced particles at a temperature of 400° to 700° C. in an inert atmosphere, or (b) reducing acicular iron oxide particles containing a zinc component at a temperature of 300° to 500° C., and then heat-treating the reduced particles at a temperature of 400° to 700° C. in an inert atmosphere, or (c) heat-treating acicular iron oxide particles expressed by the formula FeOx (1.0<x<1.33) containing a zinc component at a temperature of 400° to 700° C. in an inert atmosphere.

* * * * *